United States Patent
Lin

(10) Patent No.: US 11,249,563 B2
(45) Date of Patent: Feb. 15, 2022

(54) INPUT TOUCH DEVICE WITH CURVED SEGMENT THAT CHANGES SHAPE

(71) Applicant: ASUSTeK COMPUTER INC., Taipei (TW)

(72) Inventor: Bin-Yi Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/903,513

(22) Filed: Jun. 17, 2020

(65) Prior Publication Data
US 2021/0004092 A1 Jan. 7, 2021

(30) Foreign Application Priority Data
Jul. 2, 2019 (TW) ................................. 108123332

(51) Int. Cl.
*G06F 3/03* (2006.01)
*G06F 3/0354* (2013.01)
*G06F 3/038* (2013.01)
*G06F 3/01* (2006.01)

(52) U.S. Cl.
CPC .......... *G06F 3/03543* (2013.01); *G06F 3/016* (2013.01); *G06F 3/038* (2013.01)

(58) Field of Classification Search
CPC ...... G06F 3/03543; G06F 3/038; G06F 3/016; G06F 2203/0333
See application file for complete search history.

(56) References Cited

U.S. PATENT DOCUMENTS

| 8,279,176 | B2 | 10/2012 | Krah et al. | |
| 10,592,008 | B1 * | 3/2020 | Wang | G06F 3/016 |
| 2012/0050163 | A1 * | 3/2012 | Shih | G06F 3/03547 345/163 |
| 2016/0239046 | A1 * | 8/2016 | Park | G04G 17/08 |
| 2016/0282899 | A1 * | 9/2016 | Inagaki | H04B 5/0037 |
| 2016/0327987 | A1 * | 11/2016 | Huitema | G06F 1/163 |
| 2018/0316783 | A1 * | 11/2018 | Ye | H04M 1/0268 |

FOREIGN PATENT DOCUMENTS

| CN | 101025664 B | 8/2007 |
| CN | 101228499 B | 7/2008 |
| WO | 2006132817 A2 | 12/2006 |

* cited by examiner

*Primary Examiner* — Liliana Cerullo
(74) *Attorney, Agent, or Firm* — McClure, Qualey & Rodack, LLP

(57) ABSTRACT

An input device is provided, including a curved segment, a sensing segment and a second sensing structure. The sensing segment is pivotally connected to the curved segment and includes a first sensing structure. The second sensing structure covers the curved segment and the sensing segment. The curved segment includes a plurality of connecting bodies and a supporting element. Each connecting body includes a recess. Adjacent connecting bodies are mutually pivotally connected, and the recesses are connected to each other to form an accommodation space. The supporting element is disposed in the accommodation space and connected to the connecting bodies.

9 Claims, 4 Drawing Sheets

INPUT TOUCH DEVICE WITH CURVED SEGMENT THAT CHANGES SHAPE

CROSS-REFERENCE TO RELATED APPLICATION

This application claims the priority benefit of Taiwan application serial No. 108123332, filed on Jul. 2, 2019. The entirety of the above-mentioned patent application is hereby incorporated by reference herein and made a part of the specification.

BACKGROUND OF THE INVENTION

Field of the Invention

The disclosure relates to an input device and, more particularly, to an input device applied to an electronic device.

Description of the Related Art

Generally, when electronic devices are operated, input devices such as keyboards and mice are mainly used to operate. With the development of touch technologies, touch mice currently hit the market. However, conventional touch mice are flat, and it is uncomfortable for users who are used to gripping mice with hand arching.

BRIEF SUMMARY OF THE INVENTION

The disclosure provides an input device, including a curved segment, a sensing segment and a second sensing structure. The curved segment includes a plurality of connecting bodies and a supporting element. Each connecting body includes a recess. Adjacent connecting bodies are mutually pivotally connected, and the recesses are connected to each other to form an accommodation space. The supporting element is disposed in the accommodation space and connected to the connecting bodies. The sensing segment is pivotally connected to the curved segment and includes a first sensing structure. The second sensing structure covers the curved segment and the sensing segment.

DETAILED DESCRIPTION OF THE EMBODIMENTS

Figure 1:
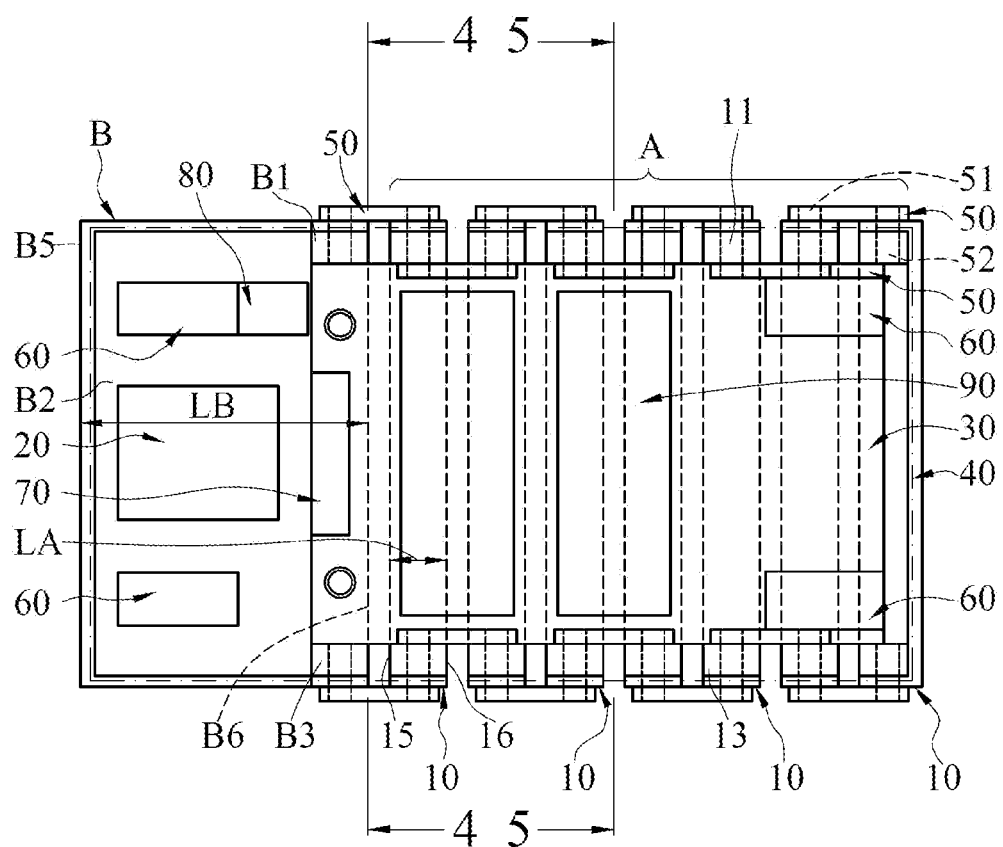
FIG. 1 is a schematic diagram of a state of a plane unfolded in an embodiment of an input device according to the disclosure.

Referring to FIG. 1 to FIG. 3 and FIG. 5, an embodiment of an input device in the disclosure includes a curved segment A, a sensing segment B and a second sensing structure 40. The curved segment A includes a plurality of connecting bodies 10 and a supporting element 30. Each connecting body 10 includes a recess 14. Adjacent connecting bodies 10 are mutually pivotally connected, and the recesses 14 are connected to each other to form an accommodation space S. The supporting element 30 is disposed in the accommodation space S and connected to the connecting bodies 10. The sensing segment B is pivotally connected to the curved segment A and includes a first sensing structure 20. The second sensing structure 40 covers the curved segment A and the sensing segment B.

In this way, users grip the curved segment A to operate the input device, and the first sensing structure 20 senses displacement of the input device. When the shape of the input device changes, each connecting body 10 of the curved segment A is reversed, and the connecting bodies 10 that are pivotally connected to each other are enabled to relatively pivotally reverse. The overall appearance of the curved segment A changes, and the supporting element 30 provides a force to maintain the shape after the connecting bodies 10 is deformed.

Referring to FIG. 1 to FIG. 5, in an embodiment, the connecting body 10 includes a first side surface 11, a bottom surface 12 and a second side surface 13 that are arranged in sequence. The first side surface 11, the bottom surface 12 and the second side surface 13 constitute a U-shaped structure including a recess 14 and one side open. The first side surface 11 and the second side surface 13 are respectively located between a first end 15 and a second end 16. Further, a direction of the connecting bodies 10 facing the recess 14 is defined as an inner side, and the other direction of the connecting bodies 10 is defined as an outer side.

Further, referring to FIG. 1, the connecting bodies 10 are intervally disposed and pivotally connected to each other in sequence. The first end 15 of one connecting body 10 is pivotally connected to the second end 16 of another connecting body 10. In an embodiment, the connecting bodies 10 are pivotally connected to each other through a connector 50. Specifically, the connector 50 is a sheet structure. The connector 50 includes a first pivot hole 51 and a second pivot hole 52. The first pivot hole 51 and the second pivot hole 52 of each connector 50 are respectively pivotally connected to two adjacent connecting bodies 10.

In addition, the inner side and the outer side of the first side surface 11 and the second side surface 13 of each connecting body 10 are both pivotally connected to a connector 50, and the connectors 50 are crisscross. Specifically, the crisscross connectors 50 are disposed in the inner side and the outer side in the manner that, in an embodiment, the connector 50 disposed in the outer side connects a first and a second connecting bodies 10, a third and a fourth connecting bodies 10, a fifth and a sixth connecting bodies 10 . . . in sequence.

The connector 50 disposed in the inner side connects the second and the third connecting bodies 10, the fourth and the fifth connecting bodies 10, the sixth and a seventh connecting bodies 10 . . . in sequence. In this way, the connecting bodies 10 are pivotally connected to each other. In this case, the connecting bodies 10 of the curved segment A are pivoted to a plane state that the bottom surfaces 12 of the connecting bodies 10 are co-planar, or the curved segment A is made to become an overall appearance shape that adapts to the users' hand grip arc.

Figure 2:
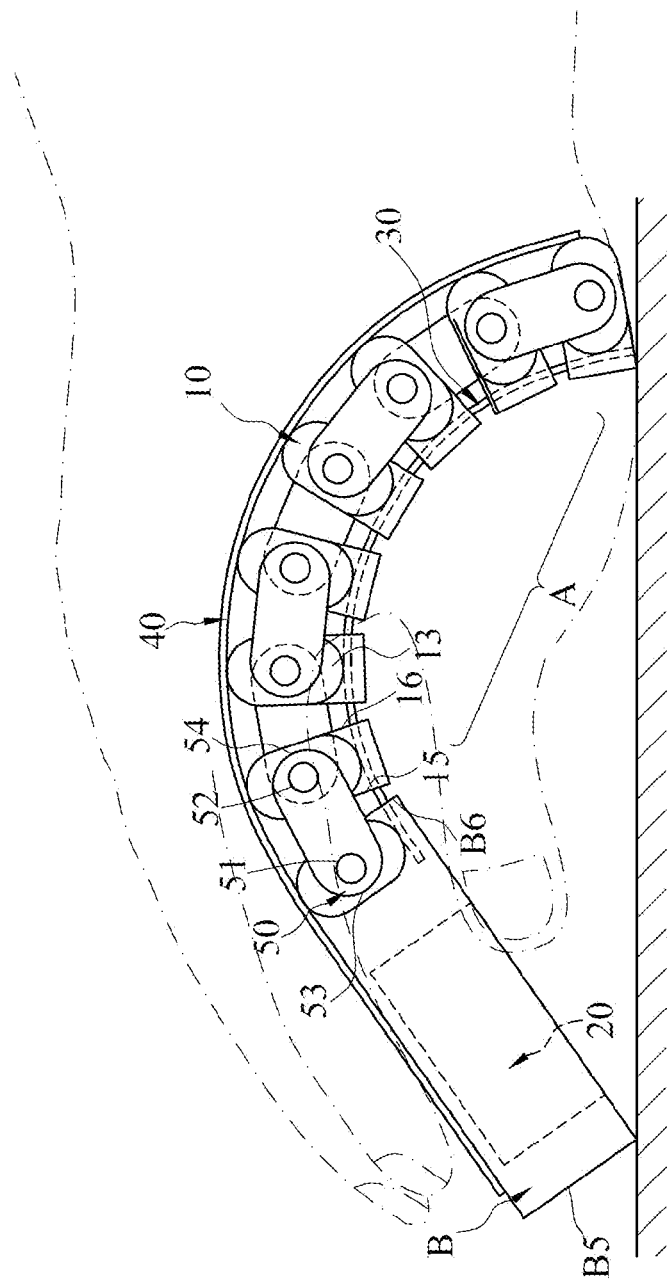
FIG. 2 is a schematic diagram of a state with radian deformed in an embodiment of the input device according to the disclosure.
Figure 3:
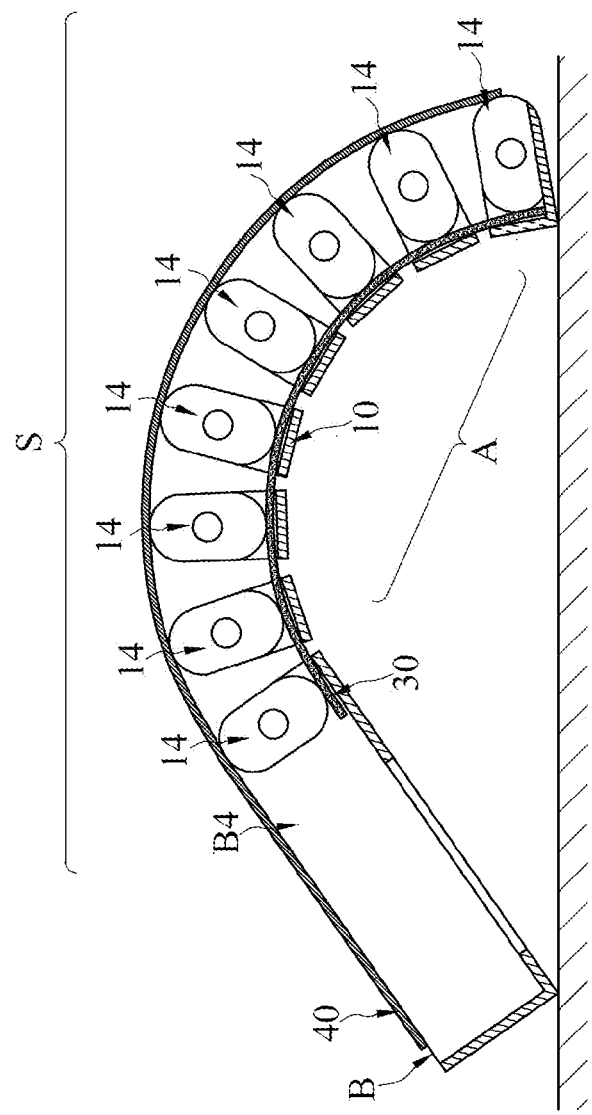
FIG. 3 is a schematic cross-sectional view of a partial structure in an embodiment of the input device according to the disclosure.

Referring to FIG. 1 and FIG. 2, in an embodiment, one connecting body 10 of the curved segment A is pivotally connected to the sensing segment B. In this way, an end of the input device is the sensing segment B, and the other end is the curved segment A including a plurality of connecting bodies 10. In this embodiment, the curved segment A is also connected to the sensing segment B through the connector 50.

Referring to FIG. 1 and FIG. 2, the sensing segment B and each connecting body 10 of the curved segment A include a same structure and a similar appearance shape. Specifically, the sensing segment B, same as each connecting body 10, also includes a first side surface B1, a bottom surface B2 and a second side surface B3 that are arranged in sequence. The first side surface B1, the bottom surface B2 and the second side surface B3 constitute a U-shaped structure including a recess B4 and one side open.

In this case, the recess B4 is defined between the first side surface B1, the bottom surface B2 and the second side surface B3. The first side surface B1 and the bottom surface B2 are respectively located between a first end B5 and a second end B6. Further, a direction of the sensing segment B facing the recess B4 is defined as an inner side, and a direction of the sensing segment B not facing the recess B4 is defined as an outer side. In an embodiment, the sensing segment B is, but is not limited to be, pivotally connected to the first end 15 of the connecting body 10 of the curved segment A by the second end B6.

A difference between the sensing segment B and each connecting body 10 of the curved segment A lies in that, a first length LA exists between the first end 15 and the second end 16 of the connecting bodies 10 of the curved segment A, and a second length LB exists between the first end B2 and the second end B3 of the sensing segment B. The first length LA is different from the second length LB. Preferably, the first length LA is less than the second length LB. Further, the second length LB is, but is not limited to, three to five times of the first length LA. In this case, the sensing segment B including a longer length and no deformation capabilities provides users with a stable operating position for finger pressing, and the curved segment A including a plurality of connecting bodies 10 includes a shorter length, which allows the users to bend to change the appearance shape, so as to adapt to the user's palm grip arc.

Referring to FIG. 1 and FIG. 2, in an embodiment, the second length LB of the sensing segment B is less than a sum of the first lengths LA of a plurality of connecting bodies 10. In this way, the length of the curved segment A including the plurality of connecting bodies 10 is more suitable for user's palm grip arc, so that the overall appearance of the input device after deformation is more in line with ergonomics in appearance design.

Figure 4:
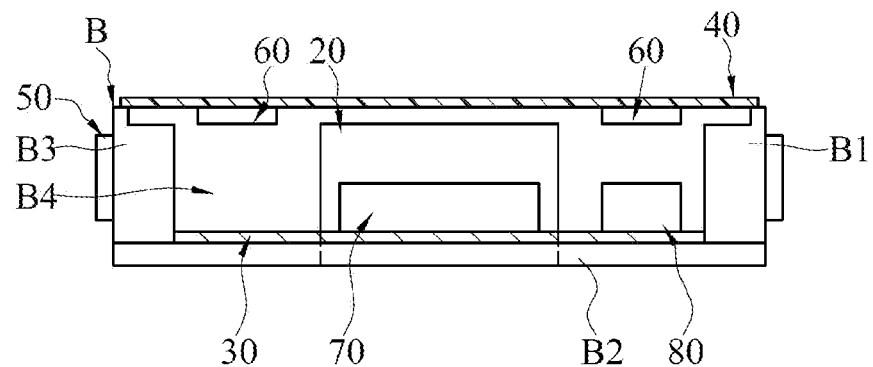
FIG. 4 is a schematic cross-sectional view taken along line 4-4 in the FIG. 1.
Figure 5:
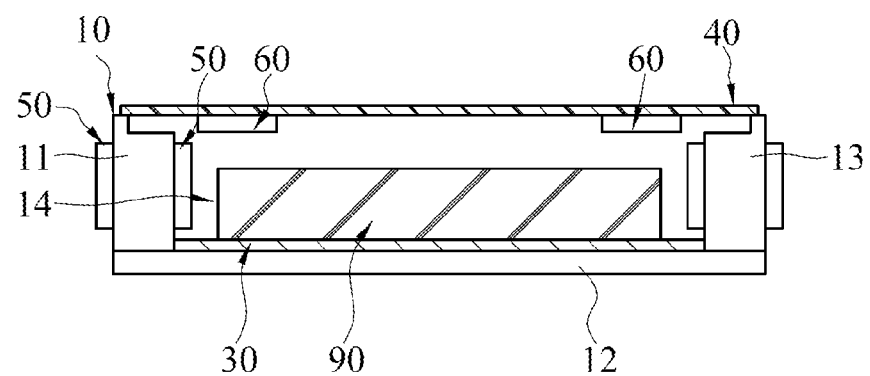
FIG. 5 is a schematic cross-sectional view taken along line 5-5 in the FIG. 1.

Referring to FIG. 2 and FIG. 4, in an embodiment, the first sensing structure 20 is disposed in the recess B4 of the sensing segment B, and protrudes to the outer side to sense the position of the overall input device. Specifically, the first sensing structure 20 is, but is not limited to, an optical sensing structure, a laser sensing structure, or a blue light sensing structure, to sense the position and actions of the input device.

When the first sensing structure 20 is an optical sensing structure, the first sensing structure 20 includes a photosensitive element. In an embodiment, the first sensing structure 20 includes a charge-coupled device (CCD), a complementary metal-oxide semiconductor (CMOS), a complementary metal-oxide semiconductor active pixel sensor (CMOS active pixel sensor), a photodiode, or a photoresistor. A displacement operation of the input device is analyzed by using light reflected back into the input device, to generate a displacement signal.

In an embodiment, the supporting element 30 is disposed in the accommodation space S including the recess 14 of each connecting body 10, and the supporting element 30 is connected to the connecting bodies 10. That is, in this embodiment, the supporting element 30 covers the recess 14 of each connecting body 10. In this way, when the shape between the connecting bodies 10 is changed, the shape of the supporting element 30 changes with each connecting body 10, and the supporting element 30 provides the force to maintain the state of each connecting body 10 after deformation. Specifically, the supporting element 30 is a metal that provides a force to maintain the shape.

In another embodiment, the supporting element 30 extends to the inside of the recess B4 of the sensing segment B, to connect to the sensing segment B, to further provide the force to maintain the shape between the curved segment A and the sensing segment B. In an embodiment, the supporting element is, but is not limited to, a 65 manganese steel, a 70 manganese steel, an 85 manganese steel, and a silicon manganese steel ($55Si_2Mn$, $60Si_2Mn$, or $60Si_2MnA$), and includes properties of high strength and reliable elasticity.

In an embodiment, the second sensing structure 40 is a flexible touch trackpad. The second sensing structure 40 covers the curved segment A and the sensing segment B. Specifically, the second sensing structure 40 is disposed on the first side surface 11 and the second side surface 13 of each connecting body 10 and the first side surface B1 and the second side surface B3 of the sensing segment B. In this case, a side of the second sensing structure 40 faces the recess 14 and the recess B4, and completely covers the recess 14 of each connecting body 10 and the recess B4 of the sensing segment B. In this way, the second sensing structure 40 is exposed to outside as a touch operating surface of the input device. Specifically, the second sensing structure 40 is, but is not limited to, a resistive touch sensing structure, a capacitive touch sensing structure, a surface acoustic wave touch sensing structure or an infrared touch sensing structure.

Further, in an embodiment in which the second sensing structure 40 is a resistive touch sensing structure, the second sensing structure 40 includes a surface layer, a base plate, two conductive layers and a multi-layer connecting body including a plurality of insulators. The surface layer is disposed to overlap the base plate, and both sides of the surface layer and the base plate facing each other are plated with the conductive layers. Each insulator is disposed between the surface layer and the base plate, to form a gap between the surface layer and the base plate. In this case, the surface layer is exposed to outside for users to perform touch operations. The surface layer of the second sensing structure 40 is deformed by pressing the surface layer, and the surface layer is in contact with and connected to the conductive layer on the base plate, so as to generate changes in resistance and voltage. The user's touch operations are determined and calculated based on the changes.

In this embodiment, the surface layer that is exposed to outside for users to perform touch operations is flexible thin glass or plastic of soft materials, the base plate is a thick glass featuring high hardness, and the conductive layer is an indium tin oxide (ITO) conductive layer, or a conductive layer configured by copper or silver wires.

In addition, to prolong service life of the second sensing structure 40, the surface layer that is exposed to outside for users to perform touch operations is further provided with a protection layer including falling crash-proof, scratch-proof and waterproof functions, to achieve the effect of prolonging life.

In addition, in an embodiment in which the second sensing structure 40 is a capacitive touch sensing structure, the second sensing structure 40 at least includes a surface layer, a glass substrate, an upper conductive layer and a lower conductive layer. The upper conductive layer and the lower conductive layer are respectively disposed on the opposite two sides of the glass substrate, and the surface layer is disposed on the upper conductive layer.

When used, voltage is applied to the upper conductive layer to form a uniform electric field, and the lower conductive layer provides a shielding effect to avoid noise interference from outside. When a conductive body (users' fingers) touches the surface layer, coupling capacitance is generated between the upper conductive layer and the conductive body, and capacitance changes are measured at four corners of the upper conductive layer, so as to calculate the touch position. In this case, the surface layer is a scratch-proof and fingerprint-proof/oil-proof glass panel featuring high hardness.

In addition, in an embodiment in which the second sensing structure 40 is a surface acoustic wave touch sensing structure, the second sensing structure 40 at least includes a surface layer, an ultrasonic emission transducer, an ultrasonic reception transducer, and a reflective strip. The ultrasonic emission transducer and the ultrasonic reception transducer are disposed at respective four corners of the surface layer, and the reflective strip is disposed around the surface layer. In this way, sound waves of the ultrasonic emission transducer and the ultrasonic reception transducer are transmitted around the surface layer to form waveform signals. When the surface layer is touched, ultrasonic waves are absorbed, and signal attenuation is caused. In this way, the touch position is calculated by comparing the attenuated waveform and the initial waveform.

In an embodiment in which the second sensing structure 40 is an infrared touch sensing structure, the second sensing structure 40 at least includes a surface layer, an infrared transmitter and an infrared receiver. An infrared transmitter array and an infrared receiver array are disposed around the surface layer. When used, the infrared transmitter array generates infrared grids, and infrared signals are blocked when the user touches the surface layer. In this way, the touch position is calculated.

In this way, when the user uses the input device, the curved segment A and the sensing segment B of the input device are co-planar to make the whole structure flat. In this state, the second sensing structure 40 of the input device is provided to be used as a touch panel. In addition, when the user arches the palm to grip the input device for using, a pivot angle between the connecting bodies 10 of the curved segment A is changed, and the overall appearance of the input device is further changed curve, to meet to the user's hand gripping requirement.

In an embodiment, the input device further includes a plurality of pressure sensors 60, and the pressure sensors 60 are disposed on a side facing the recess 14 and the recess B4 of the second sensing structure 40. The pressure sensor 60 is, but is not limited to, a capacitive pressure sensor, a resistive pressure sensor or a potentiometric pressure sensor. Specifically, four pressure sensors 60 are disposed in the input device, and the four pressure sensors 60 are each disposed at four corners of the second sensing structure 40. In this way, the second sensing structure 40 of the input device not only receives and processes general touch instructions, but also senses the user's operating pressure, and generates different functional feedback according to the user's operating pressure.

Further, in an embodiment, to ensure the smoothness of pivot transitions between the connecting bodies 10 of the curved segment A, two ends of each connector 50 respectively include a first arc edge 53 and a second arc edge 54. The central arc position of the first arc edge 53 and the central position of the first pivot hole 51 are the same, and the central arc position of the second arc edge 54 and the central position of the second pivot hole 52 are the same. In this way, when each connector 50 pivotally turns with each connecting body 10, the first arc edge 53 and the second arc edge 54 at both ends of the connector 50 reduce the chance of interference between the connector 50 and the surrounding environment, to improve the smoothness in use.

In an embodiment, to satisfy tactile feedback of traditional mouse users who are used to physical operational keys, a touch feedback element 70 is further included. In this embodiment, the touch feedback element 70 is disposed at the second end B6 of the sensing segment B, and is in a signal connection to the second sensing structure 40. In this way, when the user presses the second sensing structure 40, the second sensing structure 40 detects the operation pressure and triggers the touch feedback element 70, and the touch feedback element 70 provides the tactile feedback. Specifically, the touch feedback element 70 is, but is not limited to, a linear motor, an eccentric motor, a magnetic material or piezoelectric ceramic material, or a shape memory metal sheet.

In an embodiment, the input device is a mouse connected to the electronic device, and the input device is configured to control a cursor displayed on the electronic device (such as control a mouse cursor for displacement or clicking). The electronic device is a notebook computer, a desktop computer, or a tablet computer, which is not limited in the disclosure.

In an embodiment, the input device is a mechanical mouse, an optical mouse or a laser mouse. In terms of the transmission manner, the input device is connected to the electronic device in a wired manner, to connect to an interface (such as a USB interface) of the electronic device through a wire, to transmit data to the electronic device through the wire. Definitely, the input device is alternatively connected to the electronic device in a wireless manner, to perform wireless transmission with the electronic device by emitting infrared light, radio frequency, or Bluetooth.

In an embodiment, the input device further includes a Bluetooth element 80, disposed in one of the recesses 14 or the recesses B4. In this case, the Bluetooth element 80 is, but is not limited to, fixedly disposed in the recess B4 of the sensing segment B. In this way, the input device is configured to connect to another electronic device (such as a notebook computer) through the Bluetooth element 80 and considered as a wireless input device.

In an embodiment, a power supply 90 is further included, and disposed in one of the recesses 14 or the recesses B4. Specifically, the power supply 90 is, but is not limited to, disposed on the element 30, and electrically connected to all components of the input device that require a source of power. In an embodiment, the power supply 90 is a lithium-ion battery, and is electrically connected to the touch feedback element 70 and the Bluetooth element 80.

It is to be noted that, in some embodiments, the first sensing structure 20, the supporting element 30, the pressure sensor 60, the touch feedback element 70, the Bluetooth element 80 and the power supply 90 are all disposed in the second sensing structure 40 and the recess 14 between each bottom surface 12 and the recess B4 between each bottom surface B2. Therefore, it is more suitable for thinness configuration.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A mouse, adapted to connect to an electronic device for controlling a cursor displayed on the electronic device, the mouse comprising:
    a curved segment, comprising:
        a plurality of connecting bodies, wherein each connecting body comprises a recess, adjacent connecting bodies are mutually pivotally connected, and the recesses are connected to each other to form an accommodation space; and
        a supporting element, disposed in the accommodation space and connected to the connecting bodies;
    a sensing segment, pivotally connected to the curved segment and comprising a first sensing structure for sensing displacement of the mouse on a surface, wherein the sensing segment having no deformation capabilities; and
    a second sensing structure, covering the curved segment and the sensing segment;
    wherein the curved segment is located near a first end of the input touch device and comprises a plurality of connecting bodies that can move to collectively change the shape of the curved segment, and the sensing segment is located at another end of the input touch device opposite the first end.

2. The mouse according to claim 1, wherein a first length that exists between two ends of the connecting bodies is less than a second length that exists between two ends of the sensing segment.

3. The mouse according to claim 2, wherein the second length is less than a sum of the first lengths of the connecting bodies.

4. The mouse according to claim 1, further comprising a touch feedback element, disposed on the supporting element, and located between the supporting element and the second sensing structure.

5. The mouse according to claim 4, wherein the touch feedback element is a linear motor, an eccentric motor, a magnetic material or piezoelectric ceramic material, or a shape memory metal sheet.

6. The mouse according to claim 1, wherein the supporting element is a shape memory metal.

7. The mouse according to claim 1, further comprising a plurality of pressure sensors, disposed on a side of the second sensing structure facing the recess.

8. The mouse according to claim 7, wherein a quantity of the pressure sensors is four, and the pressure sensors are each disposed at four corners of the second sensing structure.

9. The mouse according to claim 1, further comprising a Bluetooth element, disposed in the recess.

* * * * *